United States Patent
Chae et al.

(10) Patent No.: US 7,858,003 B2
(45) Date of Patent: Dec. 28, 2010

(54) SOFT MOLD HAVING BACK-PLANE ATTACHED THERETO AND METHOD FOR FABRICATING THE SOFT MOLD

(75) Inventors: Gee Sung Chae, Incheon-Si (KR); Gyoo Chul Jo, Gyeonggi-do (KR); Jin Wuk Kim, Gyeonggi-do (KR); Chang Hee Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 992 days.

(21) Appl. No.: 11/447,918

(22) Filed: Jun. 7, 2006

(65) Prior Publication Data

US 2006/0290026 A1 Dec. 28, 2006

(30) Foreign Application Priority Data

Jun. 24, 2005 (KR) .................. 10-2005-0055193

(51) Int. Cl.
*B29C 47/26* (2006.01)

(52) U.S. Cl. .................. 264/102; 264/500; 264/571; 264/101; 264/298; 156/382

(58) Field of Classification Search .............. 264/219, 264/337, 500, 571, 101, 102, 298; 249/116, 249/114.1; 425/385; 65/32.1; 156/382
See application file for complete search history.

(56) References Cited

U.S. PATENT DOCUMENTS

| | | | | |
|---|---|---|---|---|
| 3,801,397 A | * | 4/1974 | Casserley | 156/99 |
| 4,876,042 A | * | 10/1989 | Imataki et al. | 264/39 |
| 5,772,905 A | | 6/1998 | Chou | |
| 6,176,839 B1 | * | 1/2001 | Deluis et al. | 601/2 |
| 6,247,986 B1 | * | 6/2001 | Chiu et al. | 445/24 |
| 6,660,151 B1 | * | 12/2003 | Lessmollmann et al. | 205/50 |
| 7,114,448 B2 | * | 10/2006 | Salleo et al. | 101/493 |
| 2002/0179449 A1 | * | 12/2002 | Domeier et al. | 205/67 |
| 2003/0178134 A1 | * | 9/2003 | Muramoto et al. | 156/285 |
| 2004/0135293 A1 | * | 7/2004 | Umeki | 264/494 |

FOREIGN PATENT DOCUMENTS

DE 43 07 869 9/1994

* cited by examiner

*Primary Examiner*—Khanh Nguyen
*Assistant Examiner*—Saeed M Huda
(74) *Attorney, Agent, or Firm*—Morgan, Lewis & Bockius LLP

(57) ABSTRACT

A soft mold includes a polymer layer having a printing pattern on at least a first surface thereof; and a back-plane attached to a second surface of the polymer layer.

14 Claims, 8 Drawing Sheets

SOFT MOLD HAVING BACK-PLANE ATTACHED THERETO AND METHOD FOR FABRICATING THE SOFT MOLD

This application claims the benefit of the Korean Patent Application No. 2005-0055193, filed in Korea on Jun. 24, 2005, which is hereby incorporated by reference as if fully set forth herein.

BACKGROUND OF THE INVENTION

1. Field of the Invention

The present invention relates to a soft mold, and more particularly, to a soft mold having a back-plane attached thereto and a method for fabricating the soft mold. Although the present invention is suitable for a wide scope of applications, it is particularly suitable for a soft mold for forming a fine pattern.

2. Discussion of the Related Art

To fabricate a soft mold, an elastomer is poured into a predetermined mold such that the predetermined mold is formed in one of an intaglio and a relief structure. The soft mold is provided to form a fine pattern for a micro unit. The fine pattern can be a printing pattern, such as intaglio or relief. For example, the soft mold may be used for a color filter layer formed on a color filter substrate of an LCD device, or for an electrode formed in an organic light-emitting diode (OLED). The soft mold may be formed of an elastic polymer, for example, polydimethylsiloxane (PDMS). Polyurethane or polyimide may be used as alternatives to PDMS for the soft mold. Hereinafter, a method for fabricating a soft mold according to the related art will be described with reference to the accompanying drawings.

FIGS. 1A to 1C are cross-sectional views illustrating a method for fabricating a soft mold according to the related art. As shown in FIG. 1A, first, a master mold A for providing a printing patterns, such as intaglio or relief, to a surface of a soft mold is prepared. To form the master mold A, an insulating material layer, such as silicon nitride ($Si_3N_4$) or silicon oxide ($SiO_2$) is deposited on an insulating substrate 10, such as a silicon substrate, and then the insulating material layer is patterned by photolithography to form a predetermined pattern 12 on the insulating substrate 10. In the alternative, the predetermined pattern 12 formed on the insulating substrate 10 can be made of metal, photoresist, or wax instead of silicon nitride ($Si_3N_4$) or silicon oxide ($SiO_2$).

Referring to FIG. 1B, after fabricating the master mold A, an elastic polymer (elastic elastomer) of prepolymer is poured into the master mold A, to thereby form a prepolymer layer 14. Generally, the elastic polymer is formed of polydimethylsioxane (PDMS). Then, a process for curing the prepolymer layer 14 is performed.

As shown in FIG. 1C, the cured polymer layer becomes a soft mold 16. Then, the soft mold 16 is separated from the master mold ('A' of FIG. 1B). Thus, a soft mold of the printing pattern, either intaglio or relief, in the master mold A has been taken. The soft mold may be used in various fields of soft lithography, soft molding, capillary force lithography and in-plane printing.

For long time use of the soft mold in mass production, the soft mold should be durable. In addition, the soft mold should maintain its original shape without shrinkage, expansion or deformation throughout multiple uses. The shape of the soft mold has to be especially maintained if the soft mold is used for in-plane printing for consistency in reproducability.

SUMMARY OF THE INVENTION

Accordingly, the present invention is directed to a soft mold having a back-plane attached thereto and a method for fabricating the soft mold, which substantially obviate one or more problems due to limitations and disadvantages of the related art.

An object of the present invention is to provide a soft mold having a back-plane attached thereto and a method for fabricating the soft mold that maintain dimensional form.

Another object of the present invention is to provide a soft mold having a back-plane attached thereto and a method for fabricating the soft mold having improved durability.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a soft mold includes a polymer layer having a printing pattern on at least a first surface thereof; and a back-plane attached to a second surface of the polymer layer.

In another aspect of the present invention, a method for fabricating a soft mold includes preparing a master mold having a predetermined pattern; forming a polymer layer on the master mold; applying an oxygen plasma treatment to a surface of the polymer layer; applying a coupling agent treatment to the polymer layer; and attaching a back-plane to the surface of the polymer layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
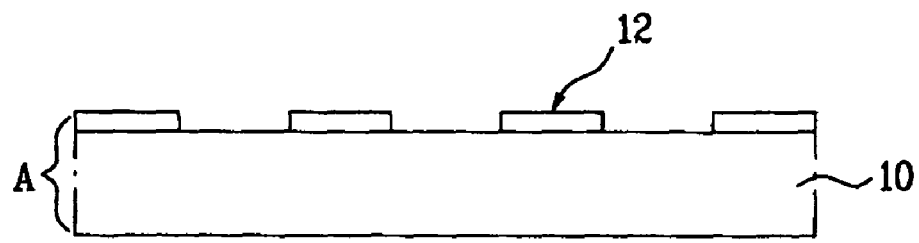
FIGS. 1A to 1C are cross-sectional views illustrating a method for fabricating a soft mold according to the related art.
Figure 1B:
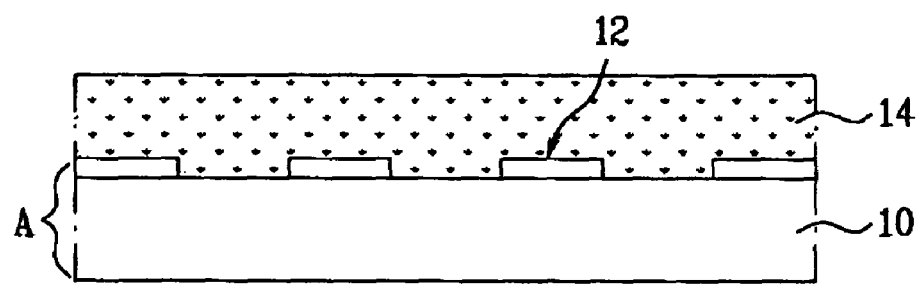
Figure 1C:
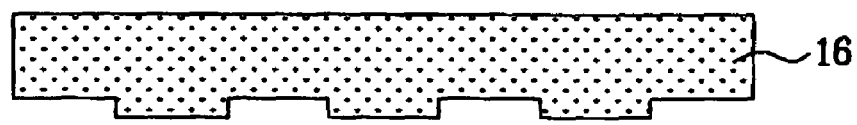
Figure 2:
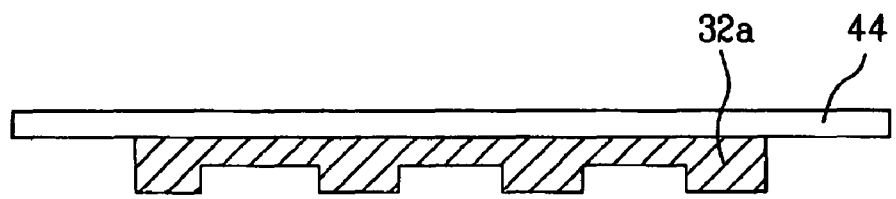
FIG. 2 is a cross-sectional view illustrating a soft mold having a back-plane according to a first embodiment of the present invention.

FIG. 2 is a cross-sectional view illustrating a soft mold having a back-plane attached thereto according to a first embodiment of the present invention. As shown in FIG. 2, the soft mold includes a polymer layer 32a having one surface with a printing pattern, and a back-plane 44 attached to a rear surface of the polymer layer 32a. The polymer layer 32a is formed of any one of polydimethylsiloxane (PDMS), polyurethane, polyimide, epoxy and novolac. The back-plane 44 is attached to the rear surface of the polymer layer 32a so as to prevent handling damage and/or dimensional change in the form of the polymer layer 32a. The back-plane 44 is formed of a rigid material, such as plastic or glass.

Figure 3A:
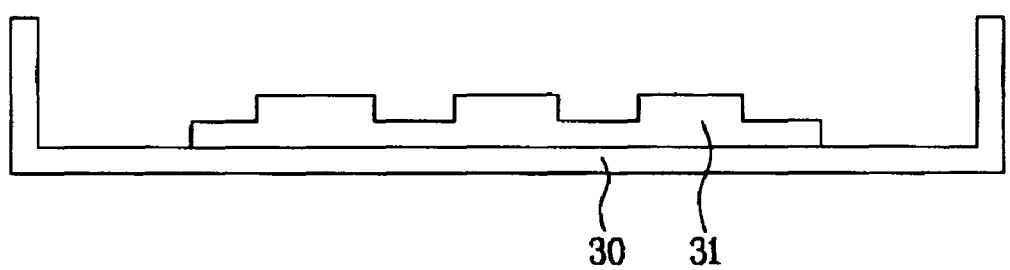
FIGS. 3A to 3G are-cross sectional views illustrating a method for fabricating a soft mold having a back-plane attached thereto according to the first embodiment of the present invention.

FIGS. 3A to 3G are cross-sectional views illustrating a method for fabricating a soft mold having a back-plane attached thereto according to the first embodiment of the present invention. In the method for fabricating the soft mold according to the first embodiment of the present invention, as shown in FIG. 3A, a master mold 31 is positioned in a jig 30 for providing the printing pattern, either intaglio or relief, to a surface of a soft mold. To form the master mold 31, an insulating material layer, such as silicon nitride ($Si_3N_4$) or silicon oxide ($SiO_2$), is deposited on an insulating substrate, such as a silicon substrate, and then the insulating material layer is patterned by photolithography. Thus, a predetermined pattern is formed on the insulating substrate. In the alternative, the predetermined pattern provided on the insulating substrate can be formed of metal, photoresist, or wax.

Figure 3B:
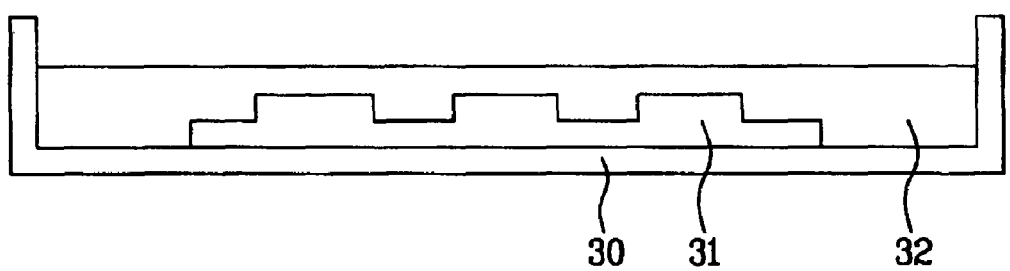

Referring to FIG. 3B, after positioning the master mold 31 in the jig 30, an elastic polymer (elastic elastomer) of prepolymer state is poured to the master mold 31, to thereby form a prepolymer layer 32. In the alternative, any polymer material which is similar in property to the elastic polymer may be used. For example, the prepolymer layer 32 may be formed of any one of polydimethylsiloxane (PDMS), polyurethane, polyimide, epoxy and novolac. Then, the prepolymer layer 32 is cured.

Figure 3C:
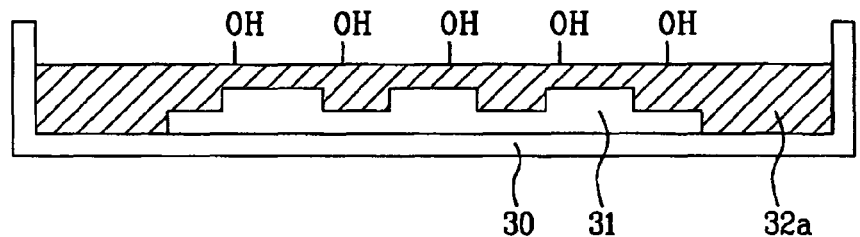

Next, as shown in FIG. 3C, an oxygen $O_2$ plasma treatment is applied to the surface of the cured polymer layer 32a such that compounds at the surface of the cured polymer layer 32a are substituted with '—OH' group compounds.

Figure 3D:
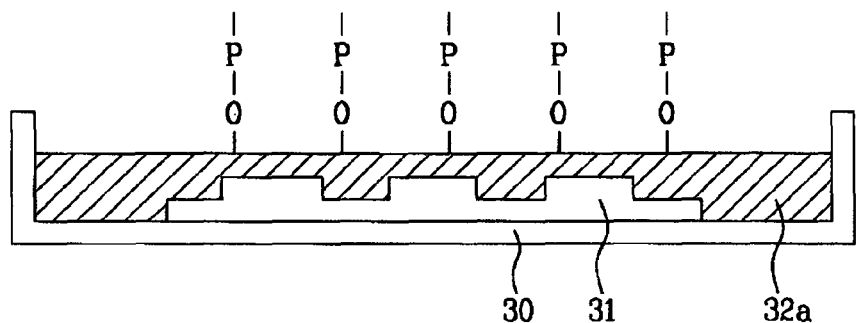

Subsequently, as shown in FIG. 3D, a silane coupling agent treatment is applied to the surface of polymer layer 32a having substituted '—OH' group compounds. The silane coupling agent treatment is performed to improve adhesion between the polymer layer 32 and a later attached back-plane. The silane coupling agent treatment is used as a general primer. The general primer will easily adhere to the surface of the glass or plastic back-plane that will be attached later. However, the general primer will not adhere to the polymer layer 32a of the soft mold, unless the oxygen plasma treatment is performed on the polymer layer 32a.

Figure 3E:
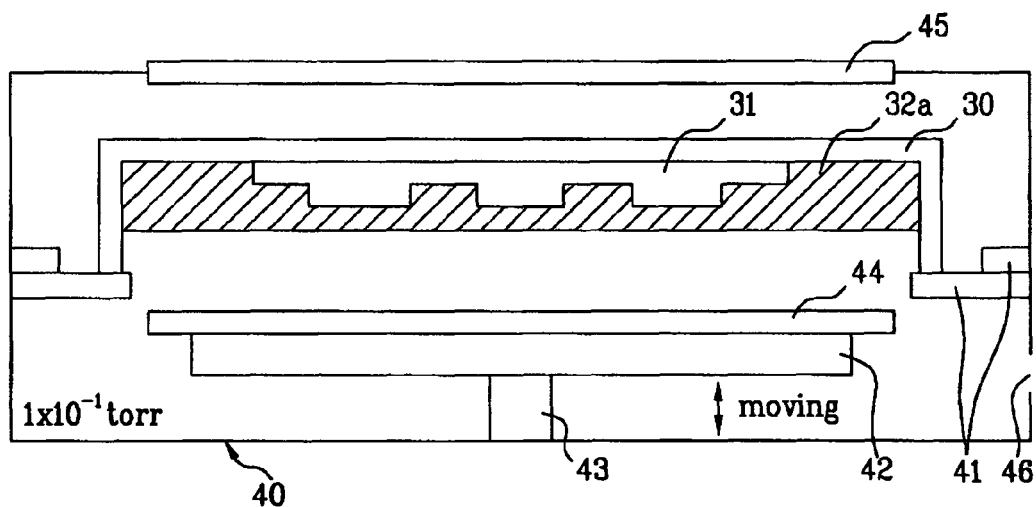

Next, as shown in FIG. 3E, before separating the polymer layer 32a from the master mold 31, the polymer layer 32a formed in the jig 30 is positioned in a vacuum chamber 40. The vacuum chamber 40 is provided with a jig supporter 41 for supporting the jig 30 having the polymer layer 32a, a stage 42 on which the back-plane 44 is loaded, a stage driver 43 for moving the stage 42 up and down, and a window 45 is provided on the top of the vacuum chamber 40. The back-plane 44 is loaded onto the stage 42 of the vacuum chamber 40 either before or after the polymer layer 32a formed in the jig 30 is positioned in a vacuum chamber 40.

Figure 3F:
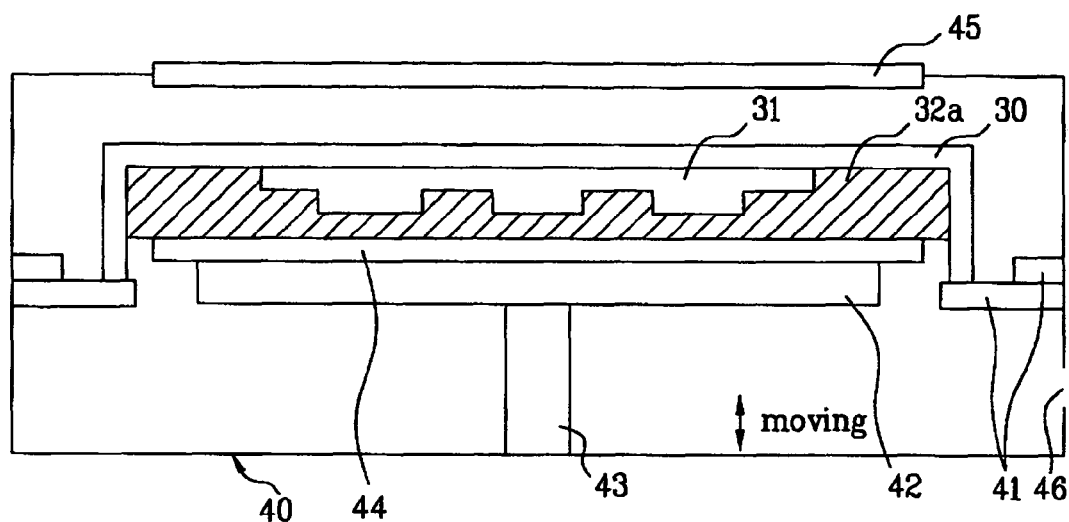

Next, as shown in FIG. 3F, the stage driver 43 of the vacuum chamber 40 moves up to attach the back-plane 44 to the rear surface of the polymer layer 32a. The back-plane 44 is attached to the surface of the polymer layer 32a under a vacuum state so as to prevent bubbles from being generated between the polymer layer 32a and the back-plane 44. Even though some bubbles may be generated between the polymer layer 32a and the back-plane substrate 44, the bubbles can be removed by venting through a vacuum hole 46 provided in the vacuum chamber 40.

Figure 3G:
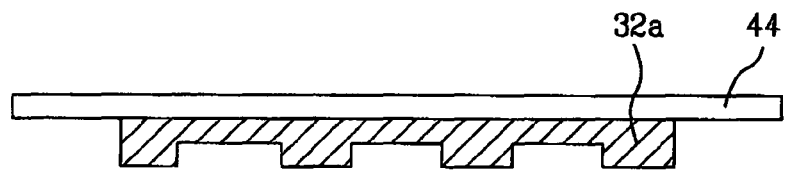

Next, as shown in FIG. 3G, the polymer layer 32a is separated from the jig 30 and the master mold 31. In other words, the jig 30 and the master mold 31 are peeled off of the polymer layer 32a. Although not shown, the polymer layer 32a can be trimmed as needed. As a result, the soft mold has one surface having the predetermined printing structure, either intaglio or relief, and the other surface with the back-plane 44 attached thereto.

In the method for fabricating the soft mold according to the first embodiment of the present invention, before attachment of the back-plane 44 and the polymer layer 32a, the oxygen plasma treatment and the silane coupling agent treatment are performed to the surface of the polymer layer 32a. Also, the back-plane 44 is attached in the vacuum chamber before separating the polymer layer 32a from the jig 30 and the master mold 31.

Figure 4:
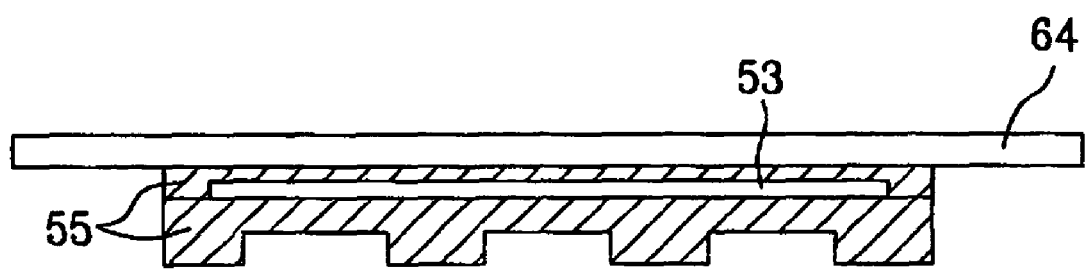
FIG. 4 is a cross-sectional view illustrating a soft mold having a back-plane attached thereto according to a second embodiment of the present invention.

FIG. 4 is a cross-sectional view illustrating a soft mold having a back-plane attached thereto according to the second embodiment of the present invention. As shown in FIG. 4, the soft mold of the second embodiment of the present invention is provided with a completely cured polymer layer 55 that has a front surface with a printing pattern, a pole-shaped film 53 within the polymer layer 55, and a back-plane 64 attached to a rear surface of the polymer layer 55.

The back-plane 64 can be formed of glass or plastic. The film 53 may be formed of a magnetic material. The back-plane 64 is attached to the rear surface of the polymer layer 55 so as to prevent handling damage and/or dimensional change in the form of the polymer layer 55. Also, the film 53 is provided to improve the durability of the polymer layer 55.

Figure 5A:
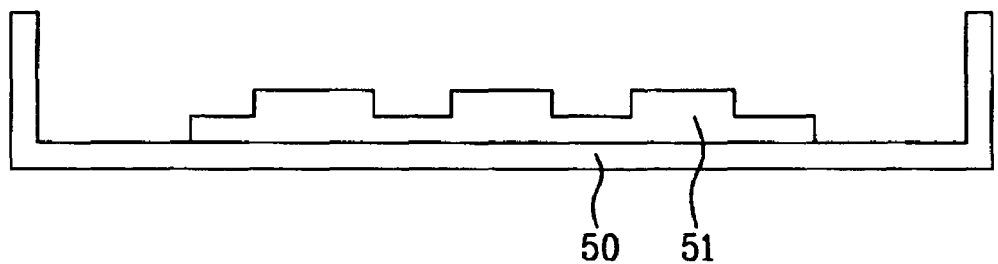
FIGS. 5A to 5H are cross-sectional views illustrating a method for fabricating a soft mold having a back-plane attached thereto according to the second embodiment of the present invention.

FIGS. 5A to 5H are cross-sectional views of illustrating a method for fabricating a soft mold having a back-plane attached thereto according to the second embodiment of the present invention. In the method for fabricating the soft mold according to the second embodiment of the present invention, as shown in FIG. 5A, a master mold 51 for providing a printing pattern, either intaglio or relief, to a surface of a soft mold is positioned in a jig 50 of a rectangular frame. To form the master mold 51, an insulating material layer, such as silicon nitride ($Si_3N_4$) or silicon oxide ($SiO_2$), is deposited on an insulating substrate, such as a silicon substrate, and then the insulating material layer is patterned by photolithography to form a predetermined pattern on the insulating substrate. In the alternative, the predetermined pattern provided on the insulating substrate may be formed of metal, photoresist, or wax.

Figure 5B:
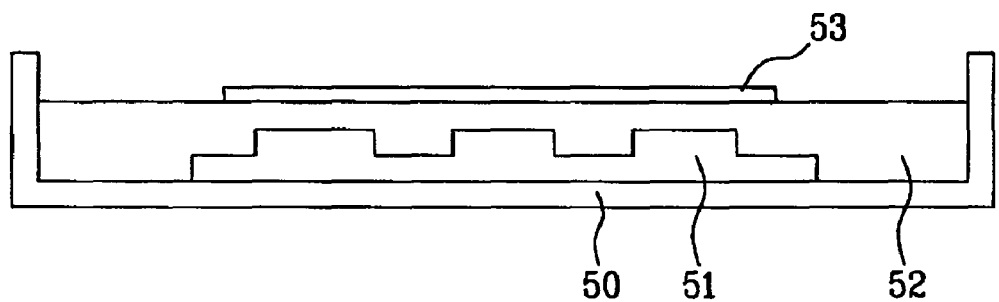

Referring to FIG. 5B, after positioning the master mold 51 in the jig 50, an elastic polymer (elastic elastomer) of prepolymer state is poured into the master mold 51, to thereby form a first prepolymer layer 52. In the alternative, any polymer material which is identical in property to the elastic polymer may be used. For example, the first prepolymer layer 52 may be formed of any one of polydimethylsiloxane (PDMS), polyurethane, polyimide, epoxy and novolac. Then, the film 53 having a predetermined thickness is adhered to the first prepolymer layer 52. The film 53 may be formed of a magnetic material for improved adherence of the soft mold. Before the adhesion of the film 53, the first prepolymer layer 52 may be partially cured.

Figure 5C:
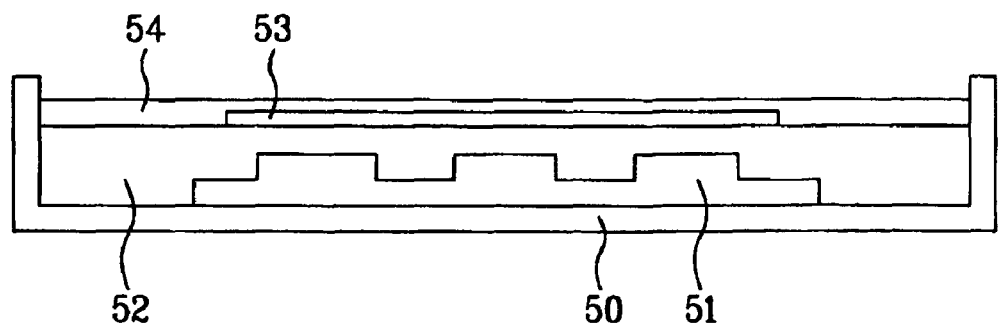

Next, as shown in FIG. 5C, a second prepolymer layer 54 is formed over both the first prepolymer layer 52 and the film 53.

Figure 5D:
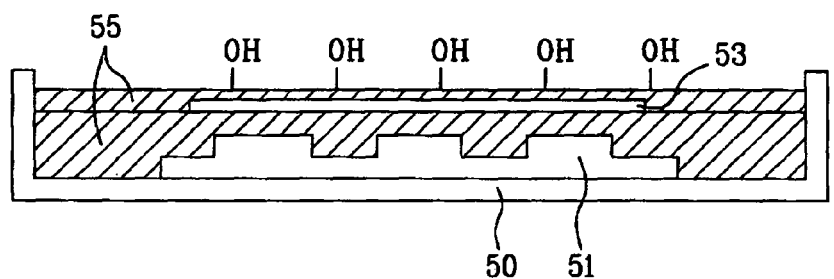

Subsequently, as shown in FIG. 5D, the first and second prepolymer layers 52 and 54 are cured to form a cured polymer layer 55. The film 53 is parallel to the rear surface of the polymer layer 55. Then, an oxygen $O_2$ plasma treatment is applied to the surface of the completely cured polymer layer 55, such that the surface of the completely cured polymer layer 55 has compounds substituted with an '—OH' group compound.

Figure 5E:
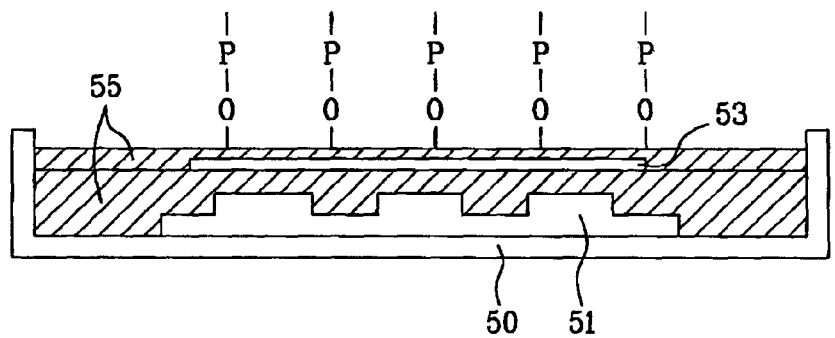

Subsequently, as shown in FIG. 5E, a silane coupling agent treatment is applied to the surface of polymer layer 55 having substituted '—OH' group compounds. The silane coupling agent treatment is performed to improve adhesion between the polymer layer 55 and a later attached back-plane. The silane coupling agent treatment is used as a general primer. The general primer will easily adhere to the surface of the glass or plastic back-plane that will be attached later. However, the general primer will not adhere to the polymer layer 55 of the soft mold, unless the oxygen plasma treatment is performed on the polymer layer 55.

Figure 5F:
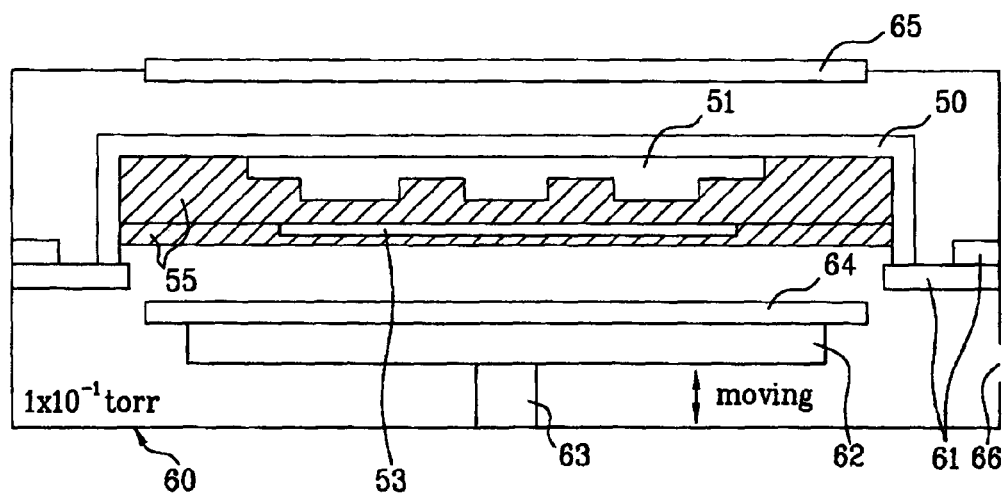

Next, as shown in FIG. 5F, before separating the polymer layer 55 from the master mold 51, the polymer layer 55 formed in the jig 50 is positioned in a vacuum chamber 60. The vacuum chamber 60 is provided with a jig supporter 61 for supporting the jig 60 having the polymer layer 55, a stage 62 on which the back-plane 64 is loaded, a stage driver 63 for moving the stage 62 up and down, and a window 65 is provided on the top of the vacuum chamber 60. The back-plane 64 is loaded onto the stage 62 of the vacuum chamber 60 either before or after the polymer layer 55 formed in the jig 60 is positioned in a vacuum chamber 60.

Figure 5G:
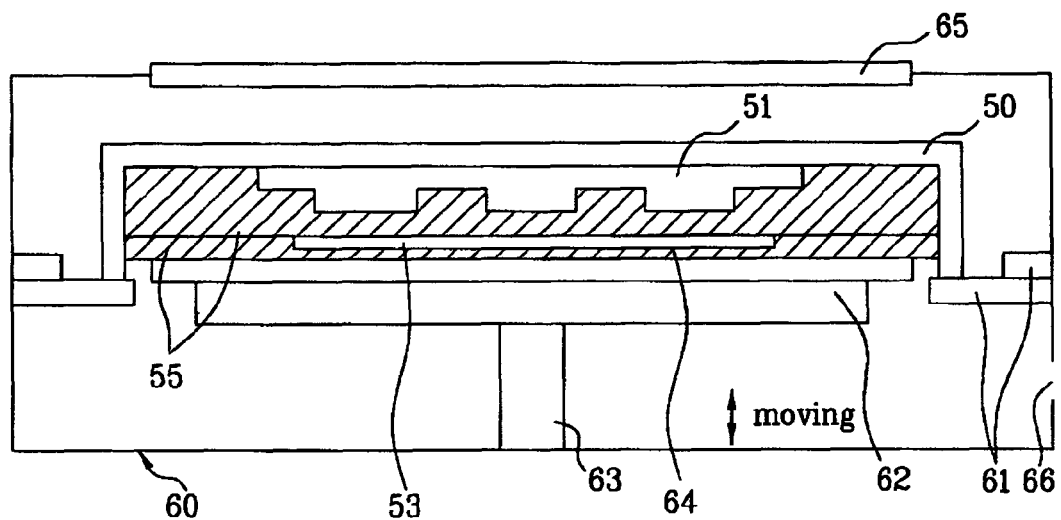

Then, as shown in FIG. 5G, the stage driver 63 of the vacuum chamber 60 moves up to attach the back-plane 64 to the rear surface of the polymer layer 55. The back-plane 64 is adhered to the surface of the polymer layer 55 under the vacuum state, so as to prevent bubbles from being generated between the polymer layer 55 and the back-plane 64. Even though some bubbles may be generated between the polymer layer 55 and the back-plane 64, the bubbles can be removed by venting through a vacuum hole 66 provided in the vacuum chamber 60.

Figure 5H:
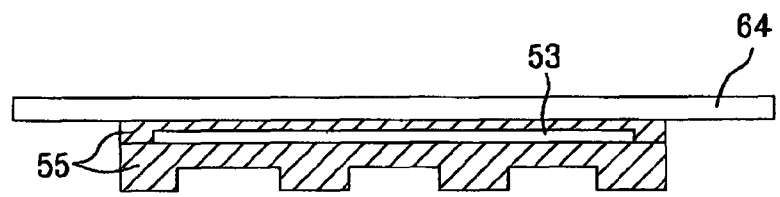

Next, as shown in FIG. 5H, the polymer layer 55 is separated from the jig 50 and the master mold 51. Although not shown, the polymer layer 55 can be cut as needed. Accordingly, a soft mold that includes a polymer layer 55 having a front surface with one of an intaglio and a relief structure and a film 53 within the polymer layer 55 is adhered to the back-plane 64 at the rear surface of the polymer layer 55.

In the method for fabricating the soft mold according to the second embodiment of the present invention, before separating the polymer layer 55 from the jig 50 and the master mold 51, the back-plane 64 is adhered to polymer layer 55 in the vacuum chamber. The polymer layer 55 contains the film 53. Also, the oxygen plasma treatment and the silane coupling agent treatment are performed to the surface of the polymer layer 55 before adhesion of the back-plane 64 in the vacuum chamber.

The following table 1 shows dimension changes in a bulk type soft mold having only soft mold without a back-plane, a soft mold having a back-plane attached thereto according to a general adhering method, in which no oxygen plasma is used and no silane treatment is performed, and a soft mold fabricated according to the preferred embodiment of the present invention.

TABLE 1

| Mold Type | Dimension Change | |
|---|---|---|
| | mold | between molds |
| bulk type soft mold | 10,000 ppm | 10,000 ppm |
| soft mold having the back-plane attached thereto (in the general adhering method after separation from the master mold) | 1,900 ± 20 ppm | hundreds ppm |
| soft mold fabricated according to the preferred embodiment of the present invention | 50 ± 10 ppm | several ppm |

As shown in the above table 1, the soft mold fabricated according to the preferred embodiment of the present invention has less dimensional change than the bulk type soft mold and the soft mold having the back-plane attached thereto (in the general adhering method after separation from the master mold).

The back-plane is attached to the rear surface of the cured polymer layer, so that it is possible to prevent handling damage and dimensional changes to the cured polymer layer. Also, the back-plane can be attached to the rear surface of a polymer layer containing a film within the polymer layer so as to improve the durability of the soft mold and to decrease deformation of the soft mold. Furthermore, before separating the polymer layer from the master mold, the back-plane is attached to the polymer layer under a vacuum to prevent bubbles from being generated between the polymer layer and the back-plane. In addition, it is possible to maintain the consistency in a printing process by using a durable soft mold having decreased deformation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for fabricating a soft mold comprising:
    preparing master mold having a predetermined pattern;
    positioning the master mold in a jig for performing the processes of forming a polymer layer;
    forming a pre-polymer layer on the master mold in the jig and curing the prepolymer to form a polymer;
    applying an oxygen plasma treatment to a surface of the polymer layer, wherein the surface of the polymer layer is not a surface facing the predetermined pattern of the master mold;
    applying a coupling agent treatment to the surface of the polymer layer;
    positioning the polymer layer in a vacuum chamber to perform attaching a back-plane to the surface of the polymer layer by moving a stage driver of the vacuum chamber up so as to attach the back-plane to the surface of the polymer layer; and
    separating the polymer layer having the back-plane attached thereto from the master mold.

2. The method of claim 1, wherein the prepolymer layer includes an elastic polymer material.

3. The method of claim 1, wherein the prepolymer layer is selected from the group consisting of polydimethylsiloxane, polyurethane, polyimide, epoxy and novolac.

4. The method of claim 1, wherein the prepolymer layer includes at least one of polydimethylsiloxane, polyurethane, polyimide, epoxy and novolac.

5. The method of claim 1, wherein the applying the oxygen plasma treatment to the surface of the polymer layer includes substituting compounds from the surface of the polymer layer with '—OH' groups.

6. The method of claim 1, wherein the applying the coupling agent treatment includes applying a silane coupling agent.

7. The method of claim 1, wherein the vacuum chamber is provided with a jig supporter for supporting the jig, a stage on which the back-plane is loaded, and the stage driver for moving the stage up and down.

8. The method of claim 1, wherein the attaching the back-plane to the polymer layer is performed in a vacuum.

9. The method of claim 1, further comprising a venting process after attaching the back-plane to the surface of the polymer layer.

10. The method of claim 1, wherein the preparing the master mold includes depositing an insulating material layer on an insulating substrate and patterning the deposited insulating material layer by photolithography to form the predetermined pattern on the insulating substrate.

11. The method of claim 1, wherein the forming the prepolymer layer on the master mold includes:
    forming a first prepolymer layer on the master mold in the jig;
    positioning a film on a surface of the first prepolymer layer;
    forming a second prepolymer layer on the first prepolymer layer including the film in the jig.

12. The method of claim 11, wherein the first and second prepolymer layers are concurrently cured after forming the second prepolymer layer.

13. The method of claim 11, wherein the first prepolymer layer is cured before the positioning of the film.

14. The method of claim 11, wherein the film includes a magnetic material.

* * * * *